United States Patent [19]

Bond et al.

[11] 4,146,696
[45] Mar. 27, 1979

[54] INDUSTRIAL PRODUCTION OF CAST PLASTIC LENSES

[75] Inventors: Herbert M. Bond; Daniel L. Torgersen, both of St. Paul; Charles E. Ring, Minneapolis, all of Minn.

[73] Assignee: Buckbee-Mears Company, St. Paul, Minn.

[21] Appl. No.: 881,711

[22] Filed: Feb. 27, 1978

Related U.S. Application Data

[63] Continuation-in-part of Ser. No. 713,733, Aug. 11, 1976, abandoned, which is a continuation of Ser. No. 609,366, Sep. 2, 1975, abandoned.

[51] Int. Cl.$^2$ .................... C08F 18/24; G02C 7/02
[52] U.S. Cl. ........................................ 526/194; 264/1; 351/159; 526/74; 526/230.5; 526/232.1; 526/279; 526/314; 528/484; 528/491
[58] Field of Search ............... 264/1; 260/77.5 UA; 526/194, 314; 351/159

[56] References Cited

U.S. PATENT DOCUMENTS

| | | | |
|---|---|---|---|
| 2,445,535 | 7/1948 | Parsons et al. | 260/77.5 UA |
| 2,445,536 | 7/1948 | Parsons et al. | 260/77.5 UA |
| 2,701,245 | 2/1955 | Lynn | 260/77.5 UA |
| 3,872,042 | 3/1975 | Bond | 260/77.5 UA |
| 3,988,274 | 10/1976 | Masuhara et al. | 260/77.5 UA |

Primary Examiner—Harry Wong Jr.
Attorney, Agent, or Firm—Jacobson and Johnson

[57] ABSTRACT

The process of the preparation of production quantities of lens devices fabricated from synthetic resinous substances, normally referred to as "plastic lenses." The process utilizes a molding formulation which enables reusable mold cavities to be utilized, the formulation providing a proper balance between a number of processing parameters or variables, one of the primary parameters being the maintenance of a proper adherence or release capability between the surface of the lens being fabricated and the surface of the mold cavity. Specifically, it has been found that certain silanes when incorporated in the molding formulation controls the parameters so as to provide for controllable release of the lens product from the mold.

10 Claims, No Drawings

INDUSTRIAL PRODUCTION OF CAST PLASTIC LENSES

RELATED APPLICATIONS

This application is a continuation-in-part of U.S. Pat. application Ser. No. 713,733 titled "Industrial Production of Cast Plastic Lenses," filed Aug. 11, 1976, now abandoned, which in turn is a continuation of U.S. Pat. application Ser. No. 609,366 titled "Industrial Production of Cast Plastic Lenses," filed Sept. 2, 1975, now abandoned.

BACKGROUND OF THE INVENTION

1. Field of the Invention

This invention relates generally to an additive to a synthetic resin mixture of formulation for use in the production of plastic lenses, and more specifically, to a group of silanes found suitable for this purpose, with the product being useful in lenses used for eye glasses.

2. Description of the Prior Art

Lens devices fabricated from plastic resinous substances have been made in the past, with the lens devices traditionally having been made from polycarbonate resins such as diethylene glycol bis(allyl carbonate) which is known commercially in its monomeric form as allyl diglycol carbonate and in either its monomeric or polymerized form, as CR-39. It therefore should be understood that these terms are interchangeable in the art, and that the use of any of these terms commonly identifies the same monomer.

Because of the clarity, high strength and high impact resistance of CR-39 in its polymerized form, it is suitable for use in plastic lenses for eye glasses. The wide acceptance is also due to the property of high resistance to discolorization and also its resistance to physical warping or distortion. A more complete description of this type of monomer and the manufacture of this type of plastic lens can be found in the Beattle U.S. Pat. No. 2,542,386. Still another material used for lenses for eye glasses is described in the Emerson et al U.S. Pat. No. 3,297,422 which suggests the use of a starting material such as methyl methacrylate monomer. Other materials, such as copolymers of methyl methacrylate and CR-39 are known, one of which is shown in the Bond U.S. Pat. No. 3,872,042.

While the manufacture of formulation of a composition of a monomer for preparing a lens is well known, the process for industrial production of a lens comprised of a polymer consisting of two or more monomers has been extremely difficult due to the problems generated due to erratic or partial release of the plastic lens from the glass mold. The problem of release is normally resolved through control of the adherence of the surface of the plastic lens to the surface of the mold during curing within the mold and has been found to be dependent on many processing parameters or variables such as the cleanliness of the mold, the composition of the monomer mixture, the length of the curing cycle, the temperature of the curing cycle, the surface irregularities of the mold, and the shape and curvature of the mold as well as the techniques of those involved in the injection or casting process. To obtain high yields and thus make industrial production possible at acceptable rates, the adherence of the surface of the finished plastic lens product to the surface of the mold must be sufficient to firmly hold or retain the plastic lens against the mold surface through the curing stage, but yet sufficiently weak to allow cohesive separation following cure.

In the past, control of the optical quality of the lens devices was obtained by control of the monomer mixture. When it was determined that the monomer mixture would produce a lens of a quality sufficient for optical use, then an examination of the casting, molding, or other production steps to be utilized revealed that the pre-release of the molded product from the surface of the mold (i.e., the release of the lens from the surface of the mold prior to the complete curing of the lens) would normally yield a product of unacceptable optical quality.

One prior art method used to control the release is the use of mold surface lubricants or release agents such as stearic acid. Another mold lubricant is commonly known in the trade as Ortholeum 162, its Code Name, Ortholeum 162 being a mixture of mono and dialkylphosphates with a straight chain alkyl group of C16 to C18. However, the known mold lubricants of this type have not provided the consistent control of the release of the lens from the mold when used with copolymer or multipolymer formulations and, consequently, the yield (i.e., the number of lenses from a particular run that can be used in the eye glasses) has been poor. That is, there is a tendency of the lens to release erratically from the mold by either premature release from the mold or complete adherence. If the lens releases prematurely, i.e., before the curing is completed, the lens is usually unsuitable for optical purposes. On the other hand, if the lens does not release easily subsequent to curing, one can destroy both the plastic lens and the mold by attempting to open the mold by prying the plastic lens from the mold. In either case, the plastic lens product may be unsuitable for use in eye glasses. The strange part of this phenomena of release is that the use of additives which are known to act as lubricants by decreasing the adherence of the surface of the mold to the surface of the plastic do not yield consistent results. That is, the amount of lubricant can be held constant with identical polymers and in one case, the lens may not release from the mold and in another case, the lens may release from the mold prior to completion of the curing. It is believed that such irregular results are due to variation in technique processing parameters, mold variations or other undetermined variables.

A terpolymer has been used for plastic lenses that contains acrylic acid or methacrylic acid in minor amounts to produce a terpolymer that has the desired optical qualities for use in eye glasses yet provides high yields because the lens consistently release from the surface of the glass mold at the proper time or can be easily forced to release. This terpolymer is more fully described in co-pending application Ser. No. 441,645, filed Feb. 11, 1974, now patent 3,944,637, and assigned to the same assignee as the present invention. The consistent release was somewhat surprising in that the acrylic and methacrylic acid were believed to increase the adherence of the surface of the glass mold to the surface of the plastic lens. One aspect of the problem was the tendency of the surface of the mold to adhere too strongly to the surface of the plastic lens. Nevertheless, the addition of the third monomer in the polymeric mass has been found to increase the hardness of the plastic lens as well as to solve the problems of pre-release or over-adherence of the lens to the mold. However, while this process and terpolymer has proven successful for mass production of lenses under carefully controlled conditions, the transition of the process to full scale industrial process has not been easily accomplished because the expected yields, under industrial production conditions, have not matched those obtained under laboratory conditions.

One of the problems is that with lesser amounts of CR-39, the methacrylic acid begins to polymerize first, thus producing a block polymer rather than a copolymer. Consequently, the amount of methacrylic acid used must be limited to avoid the graying of the monomer which occurs due to block polymer formation. For example, with 98 parts CR-39, the maximum amount of methacrylic acid that can be used without graying is about 1.1%. With a limited amount of methacrylic acid and because of other factors, a normal release of lenses from the molds could not be obtained.

It was believed that the transition from mass production of plastic lenses under carefully controlled conditions to normal industrial production of plastic lenses in which plastic lenses are cast, cured and polished in successive processing steps would appear to be a straight forward step as long as the variables involved in the casting and curing process were observed and taken into consideration. Surprisingly, this has not been the case. It has been discovered that in spite of the close control of the many known variables, the industrial production of plastic lenses has been very costly because of that phenomenon known as "pre-release." As a general rule, it has been found that if the percentage of product subjected to pre-release exceeds 30% of the total cast lenses, then the process of producing lenses normally becomes uneconomical. On the other hand, to make the process economical, it is also necessary to be able to fabricate about 200 castings from a single mold. However, as each lens in subject to operations of casting, curing, and subsequently removal, these operations have a deteriorating effect on the mold and, consequently, reduces the number of lenses which can be cast from a single mold. Thus, under industrial production, where the molds must be continually reused to make the process economically sound for large quantity production of plastic lenses, some sort of balance must be achieved between the number of lenses that pre-release and the length of the mold life. If the pre-release percentage is too low, the mold life decreases too rapidly; while if the pre-release percentage is too high, the number of acceptable lenses produced becomes unacceptable. The control of the known variables has not been sufficient to achieve a proper balance between the percentage of lenses that pre-release and the number of castings per mold. However, with the controlled addition of certain silanes, it has been found that a dominant production variable is provided which will allow casting of plastic lenses of both copolymers and terpolymers with the desired release characteristics.

BRIEF SUMMARY OF THE INVENTION

Briefly, the present invention involves the discovery that adding a silane to the molding compound, the silane being selected from the group consisting of:

$R_a Si X_b$ wherein "R" represents the organic functional group, "X" represents the hydrolyable functional group, and "a" and "b" each represent integers ranging from between 1 and 3.

The organic functional group may be a vinyl group, although other radicals are useful. Normally, chain lengths from 2 to 4 carbon atoms are preferred in the moiety. The hydrolyzable functional group may be any of the following:

| | |
|---|---|
| - methoxy | - phenoxy |
| - ethoxy | - fluoro |
| - acetoxy | - bromo |
| - chloro | - iodo |
| - methoxyethoxy | - propoxy |
| - ethoxymethoxy | - butoxy | or generally, any low molecular weight alkoxy end group or halogen end group, the alkoxy end group having up to $C_6$.

Examples of some of those silanes found useful are as follows:
Vinyltrichlorosilane
Vinyltriacetoxysilane
gamma-Glycidoxypropyltrimethoxysilane
Vinyltriethoxysilane
gamma-Methacryloxypropyltrimethoxysilane
beta-(3,4-epoxycyclohexyl)-ethyltrimethoxysilane
Methylvinyldichlorosilane
Vinyl-tris(beta-methoxyethoxy)silane
Vinyltrimethoxysilane The molding compound is either a copolymer of methyl methacrylate and diethylene glycol bis(allyl carbonate) or a terpolymer comprised of methyl methacrylate, diethylene glycol bis(allyl carbonate) and either acrylic acid or methacrylic acid. This compound produces lenses that can be economically manufactured using industrial production techniques. Of these silanes, the preferred silane is gamma-glycidoxypropyltrimethoxysilane.

It is presently preferred that the organic functionally group is selected from methyl, gamma-glycidoxypropyl, vinyl, and beta-(3,4-epoxycyclohexyl)ethyl. Most preferred is gamma-glycidoxypropyl.

It is presently preferred that the hydrolyzable functionality group is selected from methoxy, ethoxy, acetoxy, chloro and beta-methoxyethoxy.

DESCRIPTION OF THE PREFERRED PROCESS

While the mixtures and casting of plastic lenses is well known, the addition of the silanes to the mixture comprises the novel part of this process. In the present process, glass molds are used; however, metal molds can also be utilized.

The lenses are cast in blanks which are approximately ¼ inch thick with a diameter of about 2½ inches, and with one surface convex and the other surface concave. This configuration is required so that the lens blank can be ground to the proper prescription. The casting of this shape lens with monomers such as CR-39 is shown and described in the prior art Beattle U.S. Pat. No. 2,542,386.

Silanes have been found to work effectively with the homopolymer of diethylene glycol bis(allyl carbonate), the copolymers of methyl methacrylate and diethylene glycol bis(allyl carbonate), and the terpolymer comprised of methyl methacrylate, diethylene glycol bis(allyl carbonate) and either acrylic acid or methacrylic acid. These polymers, copolymers, and terpolymers are, of course, commercially available.

In order to produce a lens suitable for use in eye glasses, one prepares and mixes a solution of methyl methacrylate containing a catalyst such as benzoyl peroxide or diisopropyl percarbonate and a UV absorber such as p-methoxybenzylidene malonic acid dimethyl ester. After the solution has been mixed, it is dried by placing about 50 grams of anhydrous sodium sulfate per 1000 ml. of solution. Typically, a minimum of 50 grams of anhydrous sodium sulfate per 500 ml. of solution is sufficient to remove any water which may be in the solution. Next, one vacuum filters the solution through filter paper to remove the sodium sulfate. Next, a mold lubricant such as Ortholeum 162, available commercially from the E. I. Dupont deNemours Corp. of Wilmington, Delaware, is stirred into the solution. At this point, a reactant mixture is prepared containing a solution of methyl methacrylate, diethylene glycol bis(allyl carbonate), and methacrylic acid, acrylic acid may be substituted for the methacrylic acid. The solution and the container are then placed in a vacuum chamber where the entrapped or entrained air is removed. Vacuum treatment removes the air bubbles from the solution, thus reducing or eliminating the possibility of the plastic lens product having internal air bubbles. Next, the evacuated container is pressurized with admission of nitrogen to about 15 psi. After pressurizing the container with nitrogen, the solution is then forced under pressure into the molds. Once the solution is in the molds, the mold is placed in an oven at 65° C. for a minimum of about 3 hours, followed by raising the temperature from 65° C. to 75° C. over a minimum of about 4 hours, this being followed by raising the temperature from 75° C. to 100° C. over a minimum of about 10 hours, whereupon the molds are removed from the oven and allowed to cool at room temperature.

As indicated, it is a feature of the present invention to prepare a formulation through the addition of a silane selected from the group consisting of:
Vinyltrichlorosilane
Vinyltriacetoxysilane
gamma-Glycidoxypropyltriethoxysilane
Vinyltriethoxysilane
gamma-Methacryloxypropyltrimethoxysilane
beta-(3,4-epoxycyclohexyl)-ethyltrimethoxysilane
Methylvinyldichlorosilane
Vinyl-tris(beta-methoxyethoxy) silane
Vinyltrimethoxysilane
to either a copolymer of methyl methacrylate and diethylene glycol bis(allyl carbonate) or a terpolymer comprised of methyl methacrylate, diethylene glycol bis(allyl carbonate) and either acrylic acid or methacrylic acid for the production of a lens that can be economically manufactured using industrial production techniques.

Of these silanes, the preferred silane is gamma-glycidoxypropyltrimethoxysilane. The following examples will illustrate the invention.

EXAMPLE 1

In order to manufacture a lens suitable for use in an eye glass, a solution of 2 grams of methyl methacrylate containing 1.6 grams of benzoyl peroxide and 0.15 grams of a UV absorber such as p-methoxybenzylidene malonic acid dimethyl ester was prepared and mixed. The mixture is dried by placing about 50 grams of anhydrous sodium sulfate per 1000 ml. of solution. Typically, a minimum of 50 grams of anhydrous sodium sulfate per 500 ml. of solution is sufficient to remove any residual water which may be in the solution. Next, one vacuum filters the solution through filter paper to remove the sodium sulfate. Thereafter, 0.0010 gram of a lubricant (Ortholeum 162) was stirred into the solution. At this point a reactant mixture is prepared containing the 2 grams of the solution of methyl methacrylate, 98 grams by weight of diethylene glycol bis(allyl carbonate), and 0.0025 gram of gamma-glycidoxypropyltriethoxysilane. The solution and the container are then placed in a vacuum chamber where the air is removed. This serves to remove bubbles from the solution, thus eliminating the possibility of the finished product having entrained air. Next, the evacuated container is pressurized with nitrogen at about 15 psi. After pressurizing the container with nitrogen, the solution is then forced under pressure into the molds. Once the solution is in the molds, the mold is placed in an oven at 65° C. for a minimum of about 3 hours, followed by raising the temperature from 65° C. to about 75° C. over a minimum of about 4 hours which is followed by raising the temperature from 75° C. to 100° C. over a minimum of about 10 hours, whereupon the molds are removed from the oven and allowed to cool at room temperature. Of the lens cast according to the Example 1, it was found that the pre-release under industrial production was only 24%. This is an acceptable figure for industrial production.

EXAMPLE 2

Additional lenses were cast according to the process of Example 1 except that 0.0005 gram and 0.0015 gram of gamma-glycidoxypropyltriethoxysilane was added. With 0.0005 gram, the percentage of pre-release was 52%. With 0.0015 gram, the percentage of pre-release was 21.5%. The latter percentage was acceptable for industrial production.

EXAMPLE 3

The Examples of 1 and 2 were repeated except that a lens mold of different curvature was used. The procedure and results were as follows: with 0.0005 gram of gamma-glycidoxypropyltriethoxysilane, the pre-release was 50%; with 0.0015 gram, the pre-release was 38%; and with 0.0025 gram, the pre-release was 22%. With this particular lens curvature, the latter percentage is acceptable.

EXAMPLE 4

Further operations were conducted in accordance with the procedure of Example 1 in which the only components of the monomer mixture were the diethylene glycol bis(allyl carbonate) $O[CH_2CH_2OCOO(C_3H_5)]_2$, methyl methacrylate $CH_2:C(CH_3)COOCH_3$ and an acid selected from the group consisting of acrylic acid and methacrylic acid, and benzoyl peroxide $(C_6H_5CO)_2O_2$. The earlier practice of designating the diethylene glycol bis(allyl carbonate) and methyl methacrylate as being a first mixture of 100 parts in which the amounts of diethylene glycol bis(allyl carbonate) and methyl methacrylate totaled 100 parts and other materials were computed as a percentage of the diethylene glycol bis(allyl carbonate) and methyl methacrylate was continued. In these operations, the amounts of diethylene glycol bis(allyl carbonate) present in the formulation was varied from 72 parts to 98 parts (based on total monomer weight) and the methyl methacrylate balance was varied from 2 parts to 28 parts (based on the total monomer weight). The acrylic acid and methacrylic ranged from ½ to 5% by weight of the mixture. The lenses produced were of the same optical quality as those with or without the silanes, the lubricant or the UV absorber. However, as expected, the yield of lenses varies according to the amounts of silanes and lubricants in the mixture.

From the above examples and further operations, it was concluded that the amount of silanes to be added to the monomer mixture should be in excess of five parts per million for most lenses. Some lenses, depending on the curvature, would require a minimum of two parts per million, while other lenses with a different curvature would require fifteen parts per million to bring the pre-release down to a suitable value. In some extreme cases, due to configuration or the like, as much as 200 parts per million of silane are required. Examples 2 and 3 illustrate the effects of two different lenses with five, fifteen and twenty-five parts per million of the monomer mixture (i.e., 0.0005 gram; 0.0015 gram, and 0.0025 gram).

EXAMPLE 5

Finally, lens preparation operations were conducted in accordance with Example 4 in which the methyl methacrylate and acrylic acid were left out but the amount of silane added to the mixture was 0.0005 gram, 0.0015 gram, and 0.0025 gram. In each of the examples, the familiar pattern of decrease in the pre-release of the lenses from the mold occurred with the increased amounts of silanes.

In order to determine the effect of silanes in a plastic lens having a single polymer of diethylene glycol bis(allyl carbonate), a set of lenses were cast with and without any silanes. The tests were conducted with diisopropyl percarbonate ranging up to 3.3% by weight; however, both catalysts work with the polymers, copolymers and terpolymers. Although more catalysts have been used, it is preferred to limit the concentration of catalysts to less than 5% when diisopropyl percarbonate is used and less than 2% when benzoyl peroxide is used.

EXAMPLE 6

A set of lens was cast with the monomer of diethylene glycol bis(allyl carbonate) as described in Example 1 except no methyl methacrylate was used and no silanes were added to the mixture. The catalyst used was diisopropyl percarbonate rather than benzoyl peroxide. The results showed a pre-release of 42% from the molds.

EXAMPLE 7

Example 6 was repeated except that 45 parts per million of the silane gamma-glycidoxypropyltrimethoxysilane was added to the mixture. Only 28% of the lens pre-release with the silane.

With a single polymer lens of diethylene glycol bis(allyl carbonate) the silane performed the same function of reducing the pre-release of the lens from the mold although a slightly greater amount of silanes was necessary with the single polymer than the copolymers or terpolymers to obtain a pre-release figure less than 30%.

In repeated tests with more or less silanes the relationship of a decrease in the pre-release percentage as a function of the increase in amounts of silane followed the pattern as shown in Example 3.

EXAMPLE 8

Additional lenses were cast according to the process of Example 1, except that the silane was 0.0015 to 0.0050 grams vinyltrichlorosilane. The percentage of pre-release was about 7%. The lenses obtained which did not pre-release were of commercially suitable quality.

EXAMPLE 9

Additional lenses were cast according to the process of Example 1 except that the silane was 0.0050 grams of vinyltriethoxysilane. The percentage of pre-release was 60%. When additional lenses are cast with a higher concentration of silane the percentage of pre-release is lowered, and the lenses remain of acceptable quality.

EXAMPLE 10

Additional lenses were cast according to the process of Example 1 except that the silane was 0.0050 grams of vinyltriacetoxysilane. The percentage of pre-release was 40%. When additional lenses are cast with a slightly higher concentration of silane the percentage of pre-release is lowered and the lenses remain of acceptable quality.

EXAMPLE 11

Example 1 was repeated except that molds of different curvature were used. Adding 0.0050 grams of beta(3,4-epoxycyclohexyl)-ethyltrimethoxysilane produced a pre-release of 80%. Using a higher concentration of silane the percentage of pre-release is lowered and the lenses remain of acceptable quality.

The following examples illustrate the use of the process of Example 1 except that 0.0050 grams of the silane is used to demonstrate the pre-release is facilitated by the use of the silane.

TABLE I

| Example No. | Silane Used |
|---|---|
| 12 | gamma-methacryloxypropyltrimethoxysilane |
| 13 | methylvinyltrichlorosilane |
| 14 | vinyltris (beta-methoxyethoxy) silane |
| 15 | vinyltrimethoxysilane |

In each of the examples the pre-release obtained is significantly lower than the pre-release observed when no silane is used.

It has been found that the hydrolyzable functionality group may be varied widely in the silanes used with relatively minor effects on the adhesion promotion ability. For this reason a broad scope of hydrolyzable groups may be present in the silanes. It has been found that variation of the organic functionality group must be limited. Only those organic functionality groups listed have been found (so far) to be effective on adhesion promotion ability.

We claim:

1. In the process of preparing a polymerized lens comprising preparing a monomer mixture of methyl methacrylate and diethylene glycol bis(allyl carbonate); adding to said monomer mixture a lubricant, a catalyst selected from the group consisting of benzoyl peroxide and diisopropyl percarbonate ranging from between about 1% to 5% by weight of said monomer mixture to provide a reactant mixture which is forced under pressure into a lens mold;

exposing said reactant mixture to a thermal treating zone to polymerize said reactant mixture to form a copolymer with the improvement comprising:

adding to said monomer mixture sufficient silane in excess of about two parts per million so as to reduce the pre-release of lenses from the lens mold by adding a silane selected from a group consisting of vinyltrichlorosilane, vinyltriacetoxysilane, gamma-glycidoxypropyltrimethoxysilane, vinyltriethoxysilane, gamma-methacryloxypropyltrimethoxysilane, beta-(3,4-epoxycyclohexyl)-ethyltrimethoxysilane, methylvinyldichlorosilane, vinyltris (beta-methoxyethoxy) silane and vinyl trimethoxysilane.

2. The invention of claim 1 wherein an acid selected from the group consisting of acrylic acid and methacrylic acid is added to said reactant mixture.

3. The invention of claim 1 wherein said silane comprises gamma-glycidoxypropyltrimethoxysilane in excess of five parts per million.

4. The invention of claim 3 wherein gamma-glycidoxypropyltrimethoxysilane is present in an amount of between five parts per million and twenty-five parts per million.

5. In the process of preparing a polymerized lens comprising preparing a monomer mixture of methyl methacrylate and diethylene glycol bis (allyl carbonate); adding to said monomer mixture a lubricant, a catalyst selected from the group consisting of benzoyl peroxide and diisopropyl percarbonate to provide a reactant mixture which is forced under pressure into a lens mold; exposing said reactant mixture to a thermal treating zone to polymerize said reactant mixture to form a copolymer, with the improvement comprising: adding to said monomer mixture in excess of about two parts per million of a silane selected from the group consisting of those silanes having the structural formula:

$R_a Si X_b$ wherein "R" represents an organic functionality group, "X" represents a hydrolyzable functionality group, and "a" and "b" each represent integers ranging from between 1 and 3, and wherein the organic functionality group is selected from the group consisting of vinyl, glycidoxypropyl, and methyl, beta-(3,4-epoxycyclohexyl)-ethyl, and methacryloxypropyl, and wherein the hydrolyzable functionality group is selected from the group consisting of methoxy, ethoxy, acetoxy, chloro, methoxyethoxy, ethoxymethoxy, phenoxy, fluoro, bromo, iodo, propoxy and butoxy.

6. In the process of preparing a polymerized lens which process comprises: adding to diethylene glycol bis(allyl carbonate) a lubricant, a catalyst selected from the group consisting of benzoyl peroxide and diisopropyl percarbonate ranging from between about 1% to 5% by weight of the monomer mixture to provide a reactant mixture which is forced under pressure into a lens mold; exposing the reactant mixture to a thermal treating zone to polymerize said reactant mixture to form a polymer, with the improvement comprising: adding to said monomer mixture in excess of about two parts per million of a silane selected from the group consisting of those silanes having the structural formula:

$R_a Si X_b$ wherein "R" represents an organic functionally group, "X" represents a hydrolyzable functionality group, and "a" and "b" each represent integers ranging from between 1 and 3, and wherein the organic functionality group is selected from the group consisting of vinyl glycidoxypropyl, beta-(3,4-epoxycyclohexyl)-ethyl, and methacryloxypropyl, and wherein the hydrolyzable functionality group is selected from the group consisting of methoxy, ethoxy, acetoxy, chloro, methoxyethoxy, ethoxymethoxy, phenoxy, fluoro, bromo, iodo, propoxy, and butoxy.

7. In the process of preparing a polymerized lens preparing a monomer mixture comprising not more than about 50 parts of methyl methacrylate and diethylene glycol bis(allyl carbonate); adding to said monomer mixture a lubricant, a catalyst selected from the group consisting of benzoyl peroxide and diisopropyl percarbonate ranging from between about 1% to 5% by weight of said monomer mixture to provide a reactant mixture which is forced under pressure into a lens mold;
exposing said reactant mixture to a thermal treating zone to polymerize said reactant mixture to form a copolymer, with the improvement comprising.
adding to said monomer mixture sufficient silane in excess of about two parts per million so as to reduce the pre-release of lenses from the lens mold by adding a silane selected from a group consisting of vinyltrichlorosilane, vinyltriacetoxysilane, gamma-glycidoxypropyltrimethoxysilane, vinyltriethoxysilane, gamma-methacryloxypropyltrimethoxysilane, beta-(3,4-epoxycyclohexyl)-ethyltrimethoxysilane, methylvinyldichlorosilane, vinyltris (beta-methoxyethoxy) silane and vinyl trimethoxysilane.

8. In the process of preparing a polymerized lens comprising:
preparing a monomer mixture comprising not more than about 50 parts of methyl methacrylate and diethylene glycol bis(allyl carbonate); adding to said monomer mixture a lubricant, a catalyst selected from the group consisting of benzoyl peroxide and diisopropyl percarbonate to provide a reactant mixture which is forced under pressure into a lens mold; exposing said reactant mixture to a thermal treating zone to polymerize said reactant mixture to form a copolymer, with the improvement comprising: adding to said monomer mixture in excess of about two parts per million of a silane selected from the group consisting of those silanes having the structural formula:

$R_a Si X_b$ wherein "R" represents an organic functionality group, "X" represents a hydrolyzable functionality group, and "a" and "b" each represent integers ranging from between 1 and 3, and wherein the organic functionality group is selected from the group consisting of vinyl, glycidoxypropyl, and methyl, beta-(3,4-epoxycyclohexyl)-ethyl, and methacryloxypropyl, and wherein the hydrolyzable functionality group is selected from the group consisting of methoxy, ethoxy, acetoxy, chloro, methoxyethoxy, ethoxymethoxy, phenoxy, fluoro, bromo, iodo, propoxy, and butoxy.

9. In the process of preparing a polymerized lens comprising
preparing a monomer mixture comprising from two parts to 28 parts of methyl methacrylate and diethylene glycol bis (allyl carbonate); adding to said monomer mixture a lubricant, a catalyst selected from the group consisting of benzoyl peroxide and diisopropyl percarbonate ranging from between about 1% to 5% by weight of said monomer mixture to provide a reactant mixture which is forced under pressure into a lens mold;
exposing said reactant mixture to a thermal treating zone to polymerize said reactant mixture to form a copolymer, with the improvement comprising:

adding to said monomer mixture sufficient silane in excess of about two parts per million so as to reduce the pre-release of lenses from the lens mold by adding a silane selected from a group consisting of vinyltrichlorosilane, vinyltriacetoxysilane, gamma-glycidoxypropyltrimethoxysilane, vinyltriethoxysilane, gamma-methacryloxypropyltrimethoxysilane, beta-(3,4-epoxycyclohexyl)-ethyltrimethoxysilane, methylvinyldichlorosilane, vinyltris (beta-methoxyethoxy) silane and vinyl trimethoxysilane.

10. In the process of preparing a polymerized lens comprising preparing a monomer mixture comprising from 2 parts to 28 parts of methyl methacrylate and diethylene glycol bis (allyl carbonate), adding to said monomer mixture a lubricant, a catalyst selected from the group consisting of benzoyl peroxide and diisopropyl percarbonate to provide a reactant mixture which is forced under pressure into a lens mold; exposing the reactant mixture to a thermal treating zone to polymerize said reactant mixture to form a copolymer, with the improvement comprising: adding to said monomer mixture in excess of about two parts per million of a silane selected from the group consisting of those silanes having the structural formula:

$$R_a Si X_b$$

wherein "R" represents an organic functionality group, "X" represents a hydrolyzable functionality group, and "a" and "b" each represent integers ranging from between 1 and 3, and wherein the organic functionality group is selected from the group consisting of vinyl, glycidoxypropyl, methyl, beta-(3,4-epoxycyclohexyl)-ethyl, and methacryloxypropyl, and wherein the hydrolyzable functionality group is selected from the group consisting of methoxy, ethoxy, acetoxy, chloro, methoxyethoxy, ethoxymethoxy, phenoxy, fluoro, bromo, iodo, propoxy and butoxy.

* * * * *